G. P. HENDRICKS.
OXYACETYLENE TORCH.
APPLICATION FILED OCT. 3, 1917.

1,264,516.

Patented Apr. 30, 1918.

WITNESSES:
Charles Reklis
J. C. Benesch

INVENTOR
George P. Hendricks
BY Strong & Townsend
ATTORNEYS

UNITED STATES PATENT OFFICE.

GEORGE PETER HENDRICKS, OF OAKLAND, CALIFORNIA.

OXYACETYLENE-TORCH.

1,264,516.   Specification of Letters Patent.   Patented Apr. 30, 1918.

Application filed October 3, 1917. Serial No. 194,626.

*To all whom it may concern:*

Be it known that I, GEORGE P. HENDRICKS, a citizen of the United States, residing at Oakland, in the county of Alameda and State of California, have invented new and useful Improvements in Oxyacetylene-Torches, of which the following is a specification.

This invention relates to torches for oxy-acetylene welding and cutting apparatus, and has for its object to provide a single nozzle which is effective for both cutting and welding operations.

Heretofore the practice has been to provide separate nozzles and connections therefor for the two operations, thereby involving extra expense, time and trouble in changing the connections. In the present invention I provide a single nozzle and controllable connections therefor whereby with a single outfit an oxy-acetylene flame suitable for welding can be produced and also by a few simple adjustments an extra supply of oxygen can be introduced to intensify the oxy-acetylene flame for cutting purposes. Also the nozzle is adjustable at its tip to vary the size of the oxy-acetylene flame.

One form which my invention may assume is exemplified in the following description and illustrated in the accompanying drawings, in which—

Figure 1:
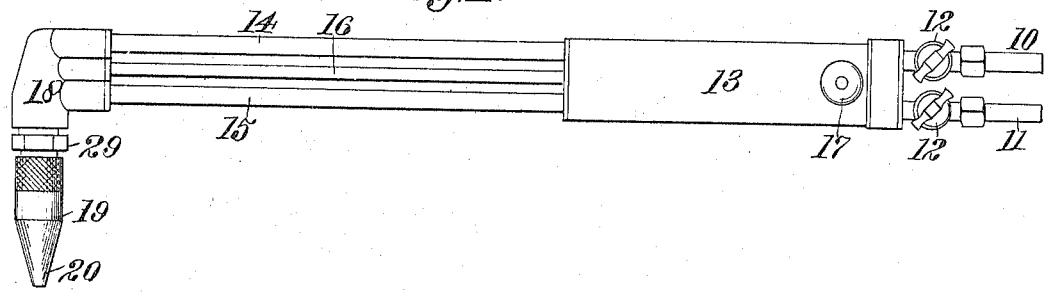
Figure 1 shows a side elevation of a torch embodying my invention.
Figure 2:
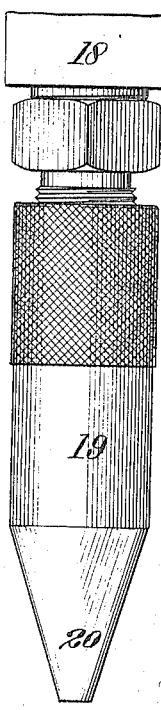
Fig. 2 shows a side elevation of the nozzle employed therein.
Figure 3:
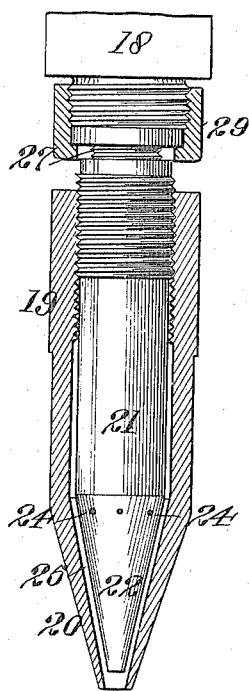
Fig. 3 shows a view of the same partly in section and partly in elevation.
Figure 4:
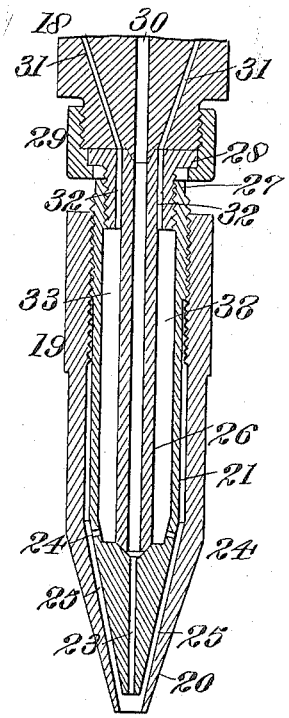
Fig. 4 shows a central longitudinal sectional view.
Figure 5:
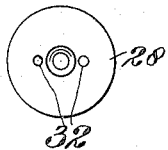
Fig. 5 shows a plan view of the stem or inner portion of the nozzle.

In the present device I employ a torch which may embody any suitable form of pipes and connections therefor, such, for instance, as shown in Fig. 1, where acetylene and oxygen hose connections 10 and 11 respectively are provided, said connections having suitable regulating valves 12 and leading to a casing 13 from which three pipes 14, 15 and 16 respectively extend. The pipes 14 and 15 communicate with the connections 10 and 11 respectively and supply acetylene and oxygen for supporting the welding flame of the torch. The pipe 16 arranged between the pipes 14 and 15 is a separate oxygen pipe for supplying oxygen whereby to enable use of the torch for cutting purposes. Preferably the pipe 16 communicates with the connection 11 through a suitable form of cut-off valve 17.

An angular coupling 18 connects with the three pipes 14, 15 and 16 and detachably receives a nozzle, which nozzle comprises an outer casing 19 having a cone-shaped tip 20, and within which is screw-threaded a tubular member 21 also formed with a conical tip 22 having a small axial bore 23. Near the base of the cone-shaped tip the walls of the tubular member are formed with apertures 24 opening into an annular space 25 between the tubular member and casing. A hollow stem 26 is positioned within the tubular member and seats at its lower end against the base of the conical tip 22, being therefore in communication with the outlet bore 23. The said stem has an enlarged upper end 27 screw-threaded into the tubular member and provided with a flange 28 seated within a union 29, which union is screwed on to the coupling member 18. The said coupling member has a central duct 30 leading from a point in communication with the pipe 16 to the stem 26, and also a duct 31 at each side of the central duct 30 leading from one of the pipes 14, 15 to the longitudinally extending bores 32 formed in the enlarged end 27 of the stem at opposite sides of the center thereof. These bores 32 open into an annular space 33 in the tubular member forming a mixing chamber for oxygen and acetylene from which the mixture discharges through the apertures 24 into the space 25 between the cone-shaped tips of the casing and tubular member, emerging therefrom to supply the flame at the tip of the nozzle. By turning the casing 19 upon the tubular member the space 25 can be varied in size whereby to change the size and shape of the flame.

In operation, if it is desired to employ the torch only for welding the pipe 16 is cut out through the valve 17 and oxygen and acetylene are supplied to the mixing chamber through the pipes 14 and 15. Then if it is desired to use the flame for cutting purposes the supply of oxygen to the pipe 16 is turned on and passes through the stem 26 of the burner and discharges through the axial bore 23 in the tip of the tubular member in whatever amount desired. At the same time if it is desired to increase or diminish the size of the oxy-acetylene flame this is accomplished by turning the casing 19 upon the tubular member whereby to move them relatively in a longitudinal direction.

It will thus be seen that I have provided a single nozzle capable of a two-fold operation and easily and quickly adjustable to vary the size and shape of the oxy-acetylene flame.

Various changes in the construction and arrangement of the several parts herein shown and described may be employed without departing from the spirit of my invention as disclosed in the appended claims.

Having thus described my invention what I claim and desire to secure by Letters Patent is:

1. An oxy-acetylene torch nozzle including a tubular member having a cone tip formed with an axial passage and lateral openings beyond the base of the cone; a hollow stem in said member communicating with said passage and being spaced from the member to form a chamber which communicates with said openings, said stem having an enlarged upper end secured to said member and formed with a pair of bores leading into said chamber, an outer casing having a cone tip threaded over said member, and a coupling member for connection with oxygen and acetylene sources of supply secured to said enlarged upper end of the stem and having a central duct communicating with the stem interior and side ducts communicating with the respective pair of bores.

2. An oxy-acetylene torch nozzle including a tubular member having a cone tip formed with an axial passage and lateral openings beyond the base of the cone; a hollow stem in said member communicating with said passage and being spaced from the member to form a chamber which communicates with said openings, said stem having an enlarged upper end secured to said member and formed with a pair of bores leading into said chamber, an outer casing having a cone tip threaded over said member, said enlarged upper end of the stem having an outwardly extending flange, a coupling member for connection with oxygen and acetylene sources of supply seating on said flange, and a union threaded onto the coupling and engaging with the flange so as to rigidly secure the coupling to the stem.

3. In an oxy-acetylene torch nozzle, a hollow stem, a tubular member surrounding the stem in spaced relation thereto to form a chamber, said member having a tip formed with a longitudinal passage communicating with the stem and having radial apertures extending into said chamber, said stem having an enlarged head formed with a pair of bores each communicating with said chamber, a casing mounted over said member and having a part spaced from the tip to form an annular space which communicates with said radial apertures, and means to supply oxygen to the stem and to one of said bores and to supply acetylene to the other bore.

4. In an oxy-acetylene torch nozzle, a hollow stem, a tubular member surrounding the stem in spaced relation thereto to form a chamber, said member having a tip formed with a longitudinal passage communicating with the stem and having radial apertures extending into said chamber, means to supply oxygen to said stem and to said chamber, means to supply acetylene to said chamber, and a casing mounted over said member and having a part spaced from the tip to form an annular space which communicates with said radial apertures.

5. In an oxy-acetylene torch, a tubular stem, a tubular member surrounding the stem and spaced therefrom to form a chamber, a tip on the stem having a passage communicating with the interior of the stem, said member having an outlet, means to supply oxygen to the stem and to the chamber, means to supply acetylene to the chamber and means surrounding the tip and formed with a passage communicating with said outlet to discharge acetylene and oxygen adjacent the tip.

In testimony whereof I have hereunto set my hand in the presence of two subscribing witnesses.

GEORGE PETER HENDRICKS.

Witnesses:
W. W. HEALEY,
M. E. EWING.